Patented June 23, 1942

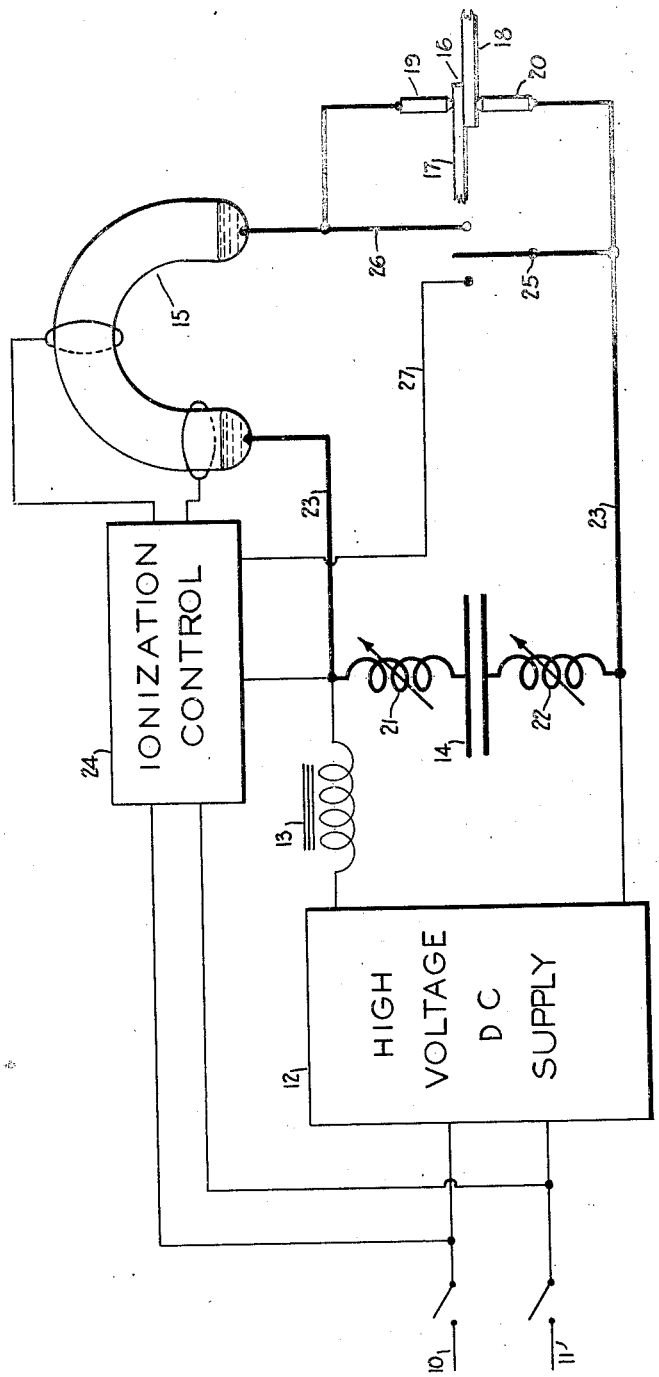

2,287,544

UNITED STATES PATENT OFFICE 2,287,544

ELECTRIC WELDING OF METALS AND THE UNITING OF DISSIMILAR METALS

Alfred Vang, Detroit, Mich., assignor to Clayton Mark & Company, Evanston, Ill.

Application February 25, 1941, Serial No. 380,427

4 Claims. (Cl. 219—10)

This invention relates to the electric welding of metals and to the uniting of dissimilar metals; and more particularly it relates to the production of a welded zone, or spot, between two metal objects, in a location which is determined by the position of the welding electrodes and the pressure applied thereby.

Conventionally, this type of welding requires electrode pressures which distort the metal adjacent to the weld to a greater or lesser degree, and it is to means for minimizing this distortion that my invention is most particularly related.

It is one object of my invention to utilize the slightest possible distortion of metals to obtain favorable contact conditions, and then to cause the welding of the metals with a minimum of further distortion.

Ancillary to this, it is an object of my invention to restrict the melting and the annealing of the metals concerned very nearly to the actual surfaces being joined.

Another object of my invention is to unite by spot welding metals having widely different physical and electrical characteristics, as, for example, aluminum with steel.

A further object of my invention is to provide a method of spot welding which will be inherently stable with regard to both power consumption and power supply.

An object ancillary to the last mentioned object is to provide a spot weld which will be consistently reliable with regard to strength.

A still further object of my invention is to extend the range of thickness of sheet metal which can be spot welded.

Other objects will be apparent from the following description and the accompanying drawing, which is a schematic representation of an embodiment of my invention.

My method of spot welding may, in brief, be carried out as follows, with reference to the drawing. Power from commercial supply lines 10 and 11 is translated to high voltage direct current, by any conventional means, which may be represented by the supply unit 12, and is permitted to flow through the choke coil 13 into a relatively large capacitor 14, which by this means accumulates a charge of electrical energy sufficient for performing the weld.

This accumulated energy may then be discharged at will, by means of the discharge tube 15, through the high frequency circuit 23, into the juncture 16 between the work pieces 17 and 18. The heavy current, which results from the discharge, will ordinarily oscillate several times through the discharge circuit, with very great rapidity; but its energy will, in the end, be largely spent in the juncture 16, where it will raise the temperature enough to perform a weld, provided the contacting electrodes 19 and 20 have been properly adjusted relative to the work, as will be explained presently.

The problem in spot welding is to define a path of least resistance between the electrodes, often through an intervening dielectric film, and often in competition with an alternative but longer path through a completed weld; and then to cause a mingling adhesion of the metal surfaces by combined heating and pressing.

Conventionally this problem is solved by applying great pressure through the electrodes for establishing the path, accompanied by a low voltage discharge through the path for heating the metal.

I solve the problem by applying light pressure through the electrodes only sufficient to establish electrode contact, but insufficient to establish the intended path, accompanied by a high voltage discharge of stored energy, which both completes the intended path and completes the weld.

Thus it is common practice in resistance spot welding to indent the metal slightly by strong pressure of the welding electrodes, in order that air gaps, or other yielding dielectric films, may be eliminated by the general upset which causes the metal between the electrodes to conform itself to irregularities of the surfaces thereof and of the juncture to be welded. In this way a path of least resistance is defined through the juncture to be welded, and it remains only to pass a current through the path in order to soften the metal therein to a degree which will cause welding by the pressure already imposed.

When the metal has softened, the electrodes tend to follow through, or approach one another, and their movement is limited mainly by the sudden cooling of the metal upon cessation of the welding current. It is, therefore, very difficult to control the extent to which the electrodes will enter the metal, as that depends largely upon a very precise timing of the duration of the welding current.

The conventional method has other disadvantages, in addition to causing an indentation. These include the annealing of the adjacent metal attendant upon the heating of the whole conductive path; and the inherent instability of control, for slight changes of current supply or electrode pressure will result either in a much deeper indentation, seriously weakening the weld, or in failure to weld at all.

I avoid these disadvantages by avoiding upset of the surfaces to be welded, thus leaving a dielectric film between the work pieces in the form of gas, oxide, grease-or other material which normally covers the surface of commercial metals. The film may not be complete, but what there is has enough resistance to the passage of current so that when the capacitor discharge is applied across the juncture a relatively high potential difference will appear between the work pieces in the vicinity of the electrodes causing the energy of the charge to be spent mainly in the film, and thus the film defines the region in which the highest temperature is generated.

It is, of course, necessary that there shall be a path of least resistance between the electrodes, otherwise the current might follow an alternate path, for example, through a previous, adjacent weld. The direct path is automatically formed during the first rush of current from the capacitor, for it is obvious that a relatively high potential will appear between the electrodes 19 and 20, due to the high frequency characteristic of the circuit 23, which will immediately create a potential gradient along any path which the current may originally follow, and the extremes of the gradient within the work will exist across the film between the electrodes.

Therefore, if the fundamental frequency of the discharge circuit is not too low, it is not difficult to create a potential which will puncture the film throughout an area centering approximately on the direct line between the electrodes. In this manner even relatively thick films can readily be punctured, especially when the capacitor is initially charged to a potential of several thousand volts, but also in many cases with a much lower potential.

The value of the potential difference which must be maintained between the work pieces in the vicinity of the weld, to perform the weld according to my invention, cannot be stated exactly, as it will vary with different applications, but it may in general be said that the maintenance of a potential difference in excess of 30 volts between the welding electrodes during the welding discharge distinguishes my invention from conventional processes.

This method of puncturing the dielectric film in spot welding has been used in part by others, notably Bohn, U. S. Patent No. 2,021,477; but the remainder of the weld has always been performed in the conventional manner, with relatively low voltage and heavy electrode pressure, resulting in unstable conditions, having the disadvantages already enumerated. This is partly because the film has been broken as a separate operation, whereby its potential value as a high resistance heating element in the welding is lost; and, partly, because the power is taken from a line or generator having a limited output, permitting loss of heat by thermal conduction before a welding temperature is attained. These factors, taken together, broaden the focus of the heating effect and thereby waste power in a manner that over-heats the metal adjacent to the weld.

Said factors constitute, as would be obvious, important differences between the prior art, and especially the patent of said Bohn, and my invention.

Thus, I have found that if the work is permitted to cool between the breaking of the film and the completion of the weld the advantages of my invention will to a large extent, if not entirely, be nullified.

Similarly, if in any other way the weld is completed without the assistance of the dielectric film as a heating element, as would be the case where the weld is completed at a lower voltage, the advantages of my invention would also be nullified.

If the high voltage impulse which breaks the film contains enough energy to complete the weld, a great increase in efficiency is obtained, for the broken film retains enough resistance to serve as a high resistance heating element, while its resistance is not great enough to force the welding current to take an alternate path. Thus, according to my invention, I can generate heat within the weld rapidly, by releasing stored energy from a high voltage source directly into the weld.

This permits me to complete a weld within a very small fraction of the time conventionally required, thus changing the welding conditions and overcoming the disadvantages mentioned, because:

1. The use of high voltage permits me to leave the surface film of dielectric material in place as a barrier of resistance wherein an intense heat will be generated.

A. By completing the weld at high voltage I do not require electrode pressure so great as to destroy the heating element which is automatically formed from the punctured barrier.

2. A welding temperature is attained so quickly at the barrier, or film, that loss by thermal dissipation is a negligible factor.

B. By using the barrier as the principal resistance, or heating element I spread the heat within a sheet-like zone which coincides with the zone of desired welding.

3. Cooling of the weld is rapid and relatively free from annealing, because the metal adjacent to the welded zone has remained relatively cool, and the amount of molten metal is relatively small.

4. The relatively high potential drop across the barrier causes the current to spread out therealong, which results in additional efficiency, because it tends to heat a greater proportion of the barrier relative to other factors, such as electrode area and power, than does the conventional method.

One of the greatest advantages of my invention lies in the fact that in most cases the greater part of the thickness of the work pieces remains solid and relatively cool, while the molten metal is confined relatively closely to the barrier.

In this manner the welding electrodes are prevented from sinking into the work, and their pressure serves mainly to secured good electrode contact, and to provide a very slight approximation of the work pieces during the weld.

For the same reason, the effect of different physical, electrical and chemical properties of the metals being joined is minimized, and it is thus possible to unite metals of widely different character with my invention.

The inductances 21 and 22 are variable high-frequency reactors, which may be adjusted to control the degree to which the heating action will spread out along the contact barrier. Thus, decreasing the value of the inductances will raise the fundamental frequency of the discharge circuit 23, raising the potential across the barrier during discharge, and causing more spread of the heating effect. If the heating should be spread too far, so that the metal is not heated enough to form a good weld, the condition can be cured by increasing the impedance of the inductors 21 and 22.

The discharge tube 15 is a type as described in my co-pending application, Ser. No. 364,701. Only one conduction initiating electrode is shown in the present embodiment, because it involves the use of a direct-current charging circuit. Other high frequency switching means may be substituted for the tube 15 without departing from the spirit of my invention.

Ionization control apparatus 24 is to be set in operation by the switch 25 after the work has been arranged between the electrodes. The capacitor 14 is presumed to be already charged, and prevented from discharging by lack of ionization of the tube 15, so that ionization of the tube will permit sudden and substantially complete discharge of the capacitor through the work.

A work-shunting lead 26 is included in the embodiment described as a protective device to minimize danger of shock to the operator. It is intended that the double-throw switch 25 be closed with the lead 26 at all times excepting during the welding operation, when it is to be closed with the ionization control lead 27.

The welding electrodes 19 and 20 should be designed to exert far less pressure upon the work than is conventional practice. For example, in one case a weld which required 3300 lbs. electrode pressure by conventional method, requires only 90 lbs., when performed according to my invention.

In general, according to my process, the electrodes require only enough pressure to secure good contact with the metal. The electrode area is small relative to the overlapped area of the work pieces, hence the stiffness of the work assists in making the pressure per unit area far greater at the point of electrode contact than between the work pieces.

If the electrodes stick to the work or "burn" the condition can be cured by increasing the electrode pressure; or by increasing the impedance of the inductances 22, 21; or by reducing the potential of the capacitor.

The combination of measures to be adopted in any particular case is an art in itself, but it is one which a person skilled in the conventional art should not find too difficult, in the light of the foregoing disclosure.

It is obvious that changes may be made in the form, construction and arrangement of the several parts, as shown, within the scope of the appended claims, without departing from the spirit of the invention, and I do not, therefore, wish to limit myself to the exact construction and arrangement shown and described herein.

What I claim as new, and desire to secure by Letters Patent of the United States, is:

1. The method of spot welding materials which includes placing said materials together so lightly as to maintain air spaces therebetween and applying to said materials a single discharge of electric current sufficiently heavy to cause an arc within said air spaces, said arc acting as a heating means for performing said weld by said single discharge, said current being supplied through spot welding electrodes applied to said materials with relatively light pressure, and said current being of such brief duration as to penetrate the materials only sufficiently to form a shallow weld therebetween.

2. A spot welding method, comprising in combination, the following steps: placing the pieces of work between opposed spot welding electrodes, applying pressure through said electrodes, said pressure being sufficient to cause a proper electrical contact between said electrodes and said work while maintaining a maximum of dielectric between the workpieces, and applying a single high frequency electrical discharge directly to said electrodes, said discharge generating sufficient energy to establish the weld by the heat generated during said single discharge.

3. A spot welding method, comprising in combination, the following steps: placing the pieces of work between opposed spot welding electrodes, applying pressure through said electrodes, said pressure being sufficient to cause a proper electrical contact between said electrodes and said work while maintaining a maximum of dielectric between the workpieces, applying a predetermined amount of electrical energy of high frequency, high voltage directly to said electrodes, said voltage being sufficient to break down said dielectric producing welding heat of brief duration whereby the extent of the weld will be localized to a shallow depth.

4. The method of spot welding characterized by the clamping of the workpieces between electrodes so as to form a partially contacting juncture between said pieces, the passage through said juncture of a current sufficiently great to cause an arc-maintaining potential in the non-contacting spaces therein, and of sufficiently brief duration to limit the welding heat substantially to said juncture.

ALFRED VANG.